United States Patent [19]

Herz

[11] 4,003,972
[45] Jan. 18, 1977

[54] METHOD OF EXTRUDING TUBING FOR FASTENER BAGS

[75] Inventor: André Herz, Nesles-la-Vallee, France

[73] Assignee: Minigrip, Inc., Orangeburg, N.Y.

[22] Filed: July 30, 1974

[21] Appl. No.: 493,026

Related U.S. Application Data

[62] Division of Ser. No. 243,966, April 14, 1972, Pat. No. 3,841,816.

[52] U.S. Cl. .................. 264/40.3; 264/89; 264/95; 264/96; 264/173; 264/177 R; 264/209; 425/326 R

[51] Int. Cl.² .......................................... B29C 17/02

[58] Field of Search .......... 264/95, 89, 209, 210 R, 264/40, 96, 173, 150, 177 R; 156/244; 425/326 R, 380

[56] References Cited

UNITED STATES PATENTS

| | | | |
|---|---|---|---|
| 3,072,962 | 1/1963 | McDermott et al. | 425/465 |
| 3,111,707 | 11/1963 | Buckley | 425/162 |
| 3,223,761 | 12/1965 | Raley | 264/171 |
| 3,266,093 | 8/1966 | Corbett | 425/72 |
| 3,320,340 | 5/1967 | Luca | 425/326 |
| 3,340,116 | 9/1967 | Naito | 156/92 |
| 3,448,183 | 6/1969 | Chisholm | 264/171 |
| 3,543,343 | 12/1970 | Staller et al. | 425/305 |
| 3,597,795 | 8/1971 | Naito | 264/95 |
| 3,700,370 | 10/1972 | Hearns et al. | 425/326 |
| 3,875,281 | 4/1975 | Behr | 264/95 |

FOREIGN PATENTS OR APPLICATIONS

| 1,286,216 | 1/1962 | France | 264/209 |
|---|---|---|---|

*Primary Examiner*—Jeffery R. Thurlow
*Attorney, Agent, or Firm*—Hill, Gross, Simpson, Van Santen, Steadman, Chiara & Simpson

[57] ABSTRACT

A method for making tubular plastic material having shaped interlocking profiles thereon for use in reclosable bags by cross-cutting and sealing the material to form the individual bags. The tubular material is made in different diameters of tubes to form bags of different depths, and the speed of delivery of the plastic material and the rate of inflation and delfation is controlled to determine the diameter of the tubing, while the plastic delivery to the profile portion of the die is separately controlled and maintained at a rate, so that, for different sizes and gauges of tubing, the profile will be maintained constant thereby obtaining a profile of optimum size and providing for bags which can be varied in size, but which can each accommodate the same closing and opening slider which fits over the profiles. This method of extruding profile tubes requires fewer changes in extrusion dies.

13 Claims, 8 Drawing Figures

METHOD OF EXTRUDING TUBING FOR FASTENER BAGS

This is a division of application Ser. No 243,966, filed Apr. 14, 1972, now U.S. Pat. No. 3,841,816.

BACKGROUND OF TH INVENION

The present invention relates to an improved method for extruding plastic tubing with integral profiles for forming reclosable bags, and more particularly to an improved method for forming said tubing of different sizes for bags of different dimensions wherein the interlocking rib and groove profiles on the tubing are the same regardless of the tube size.

This invention relates to tubing for reclosable bags of the type formed of a thin lightweight plastic such as polyethylene having mating interlocking profiles on the inner facing surfaces at the top of the bag which profiles are so shaped that they will interlock when pressed together and will separate when the edges of the bag are forced apart. Opening and closing may be done manually, but frequently is also accomplished by a slider which slides along the top of the bag forcing the interlocking profiles together when slid in one direction to close the bag, and having a separating means for separating the profiles when slid in the other direction to open the bag. To form bags of different depths, the diameter of the extruded tubing is changed and by methods heretofore available, the size of the fastener profiles have also been changed. This creates disadvantages in that with change in bag sizes, the size of the slider mounted at the top of the bag must also be changed. This is undesirable, as this type of product requires a very inexpensive slider which, therefore, must be mass produced in large volume. The requirement of several size sliders would make this type of slider bag economically unfeasible. Also, there frequently is a functionally optimum size for the rib and groove profiles and where change in bag size necessitated change in profile size, this results in a non-optimum size fastener. The fasteners which are too large create wrinkles in the film, require more time to cool and hence slow down the speed of production, tend to create problems at the bag machine cross seal and waste plastic, and the fasteners which are too small are either difficult to interlock or do not interlock properly and release and do not have the strength needed.

In the present invention, the tubes for forming the bags are manufactured by the extrusion of plastic through a die having an annular shaped opening with profile shaped notches to form the rib and groove profiles on the surface of the tubing. The tubing is expanded by inflation with a gas such as air as it emerges from the annular slot, and the size of the final tubing size and gauge will be controlled by the amount of air delivered inside the tube and the deflation or inflation resulting therefrom. With larger tubing for larger bags, it is necessary to increase the rate of plastic flow to the die unless the size of wall thickness is to be reduced. By controlling the rate of plastic flow, the wall thickness is controlled. The inflation of the tube combined with the axial flow of the plastic, controls the grain orientation thereof and the strength of the tube.

By the formation of tubes of different diameters, bags of different depths will be provided since the bags are formed by transverse cutting and bonding along the length of the tubing. Thus, by control of the extrusion speed and degree of inflation or deflation for a given thickness of plastic tubing, the depth of bags obtained from such tubing can be selectively controlled.

As inconvenience in the methods of the prior art in using the same die equipment for obtaining tubes of different diameters resided in the fact that with variation of the extrusion speed, which was necessary when the diameter of the tube to be obtained was changed, the size of the profiled rib and groove elements were also changed, but these elements were not subjected to the effects of inflation of the tube. For tubes of larger diameter the extrusion speed of plastic delivery had to be increased resulting in rib and groove profiles of larger size. The change in the cross-sectional size of the rib and groove elements presented a certain number of inconveniences. One of these inconveniences occurred when the tube was divided by bonding and transverse cutting into a number of bags. A bonding tool generally is arranged to bond a certain thickness and with change in thickness of the profile elements, it either slowed down the bonding operation or did not bond properly.

For bags made from tubing not utilizing such a slider and opened and closed through manual pressure, however, a variable profile size adjusted to the gauge of the tubing is a desirable feature, eliminating the inconvenience of having a preset profile with each tubing size and gauge.

Another inconvenience resulted in the use of closing and opening sliders wherein the same slider could not operate with profiles of different sizes. With the present invention wherein profiles of the same dimensions are obtained regardless of the size of the bag, the same slider can be used for different depths of bags.

It is accordingly an object of the present invention to provide a method and for producing bag forming profile tubes of different sizes and gauges by changing the extrusion speed and inflation or deflation, and simultaneously obtain rib and groove profiles of substantially constant size with the use of the same extruder.

In accordance with the present invention, the quantity of plastic material used for the formation of the rib and groove profiles is adjusted so as to be a function of the extrusion speed and a function of the inflation and deflation of the tubes so as to provide rib and groove elements of constant cross-sectional size. A further object of the invention is to provide a method using a die mechanism which achieves the above effects and which is capable of forming the rib and grooves from the same plastic source used for the formation of the wall of the tube. As will be further understood, in some instances principles of the invention may be employed by providing a source of plastic for the profile elements from a different source, and yet achieving the objectives of the present invention. Other advantages also accrue to the system of profile control described in this invention. These include the following.

Fewer changes in die components are required. Under the methods used heretofore it was necessary to change die components when changing gauges. This is no longer required. An overall faster speed of extrusion is made possible by the temperature of the profile extrudate being lower when the profile emerges out of the die. A better shaped profile is obtained. Since the profile extrudate is lower in temperature it can better assume the shape of the die. This also allows for a better stem formation at the juncture of the profile and the film and hence, less likelihood of profile lean or distortion.

Also, in accordance with the present invention wherein the same plastic material is used for the formation of the closure elements as for the tube wall, means are employed to regulate the quantity of plastic material used for the formation of the closure elements a considerable distance upstream from the profile discharge opening, so that regulation of the flow of plastic to the profile openings will not have the undesirable effects it did with prior art structures wherein the control was close to the rib and groove profile openings, and the results achieved with the present invention were not obtainable, i.e., it was not possible to maintain the same size profile while varying the gauge and size of the tube etc. In the present invention the extrusion head includes an annular channel which is located in advance of the annular extrusion slot and has a section that tapers from its entrance to its discharge and is used for the preformation of the wall of the tube. The plastic material for the formation of the closure profiles on the surface of the tube is conveyed separately by one or several separate conduits. The separation of the plastic for the profiles and that used for the formation of the wall of the tube takes place upstream of the die channel so that the means for regulating the quantity of material used for the formation of the profiles by regulating the flow of plastic through the conduit leading to the die exerts no adverse influence on the formation of the wall of the tube.

Generally, the profile ribs are positioned on the inner side of the tube so that means have to be provided for controlling the quantity of plastic material used for the profiles in such a manner so as to be accessible from the outside of the die. In order to accomplish this objective, the extrusion die head is attached to a base having a feed conduit connected to it originating from a heated plastic material source. The base consists of an outer housing and a central core, with the housing connected to the core by spokes and with the heated plastic material feeding the annular channel, flowing from its source, between the core and connected housing, and with the adjustment means for the conduit for the profile plastic passing through one of the spokes.

Various forms of the method may be employed in accordance with the principles of the invention as will become more apparent with the teachings thereof in connection with the disclosure of the preferred embodiment in the specification, claims and drawings, in which:

DESCRIPTION OF THE DRAWINGS

FIGS. 1(A) (B) and (C) are schematic illustrations of portions of bags formed from the tube made by the method of the present invention;

DESCRIPTION OF THE PREFERRED EMBODIMENT

Figure 1:
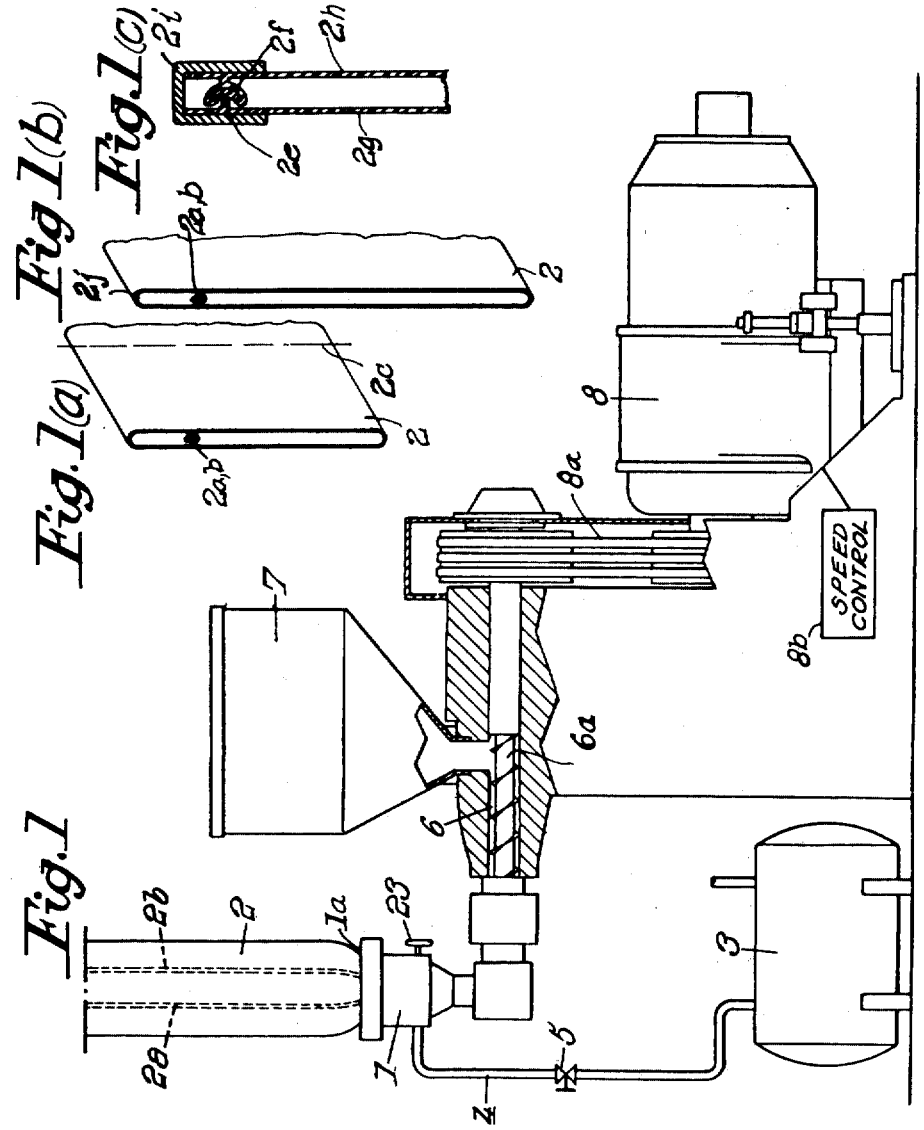
FIG. 1 is a tube forming structure constructed and operating in accordance with the principles of the present invention.

As illustrated in FIG. 1, the mechanism includes an extrusion die head 1 with a die plate 1a from which emerges a plastic tube 2 inflated or deflated, by a gas such as compressed air. The tube is of a thin plastic film and has on its surface, preferably the inner surface, shaped rib and groove profile elements 2a and 2b. The compressed air for inflating or deflating the tube 2 to a predetermined diameter is obtained from a tank 3 which is supplied by a compressor, not shown, and the air is delivered to the die head 1 through a conduit 4, with a regulating valve 5 therein which is controlled to obtain the desired expansion of the plastic tube 2. The tube 2 will be pinched off to prevent the escape of air or gas and by drawing axially on the tube at the same time as radial inflation or deflation, the plastic can obtain the desired grain orientation.

The plastic material for the tube is fed to the die head 1 by an extruder 6 which receives the plastic from a hopper 7. The extruder 6 and its hopper 7 are provided with suitable heating means to bring the plastic to the desired extrusion temperature. The rate of feed of the plastic from the extruder is controlled by the speed of rotation of a screw 6a driven by an electric motor 8 through drive belts and sheaves 8a. The motor and drive have speed control means shown schematically at 8b for controlling the speed of rotation of the screw 6a.

The plastic tube 2 is used for making bags, and as shown in FIGS. 1(A) )B) and (C), bags of different sizes may be formed by tubes of different diameters. As shown in FIG. 1(A), the tube is formed by cutting and cross-sealing along lines 2c to form individual bags. Where a tube of larger diameter is used, as shown in FIG. 1(B), the depth of the bag will be greater. The bag may be employed with a closed top 2j as shown in FIG. 1(B), or the top may be removed and a slider 2i used as shown in FIG 1(C). The slider straddles the top of the bag and may be provided with means for holding the slider onto the bag and with a separating finger for separating the fasteners when moved in an opening direction, as will be fully recognized by those versed in the art. The bag, as shown in FIG. 1(C), has side walls 2g and 2h, and on the inner surface of the wall 2g is a rib fastener element 2e, and on the inner surface of the wall 2h is a groove fastener element 2f. These elements are complementary shaped so that they interlock when they are pressed together, and separate when forcibly drawn apart.

When a family of bags is made of different sizes, as represented by FIGS 1(A) and 1(B), tubes of different diameters are extruded. In accordance with the present invention, the fastener elements 2a and 2b are made the same size for the varying sizes of bags. This permits the provision of rib and groove profile elements of optimum size and permits the use of sliders such as 2i of the same size for varying depth bags.

Figure 2:
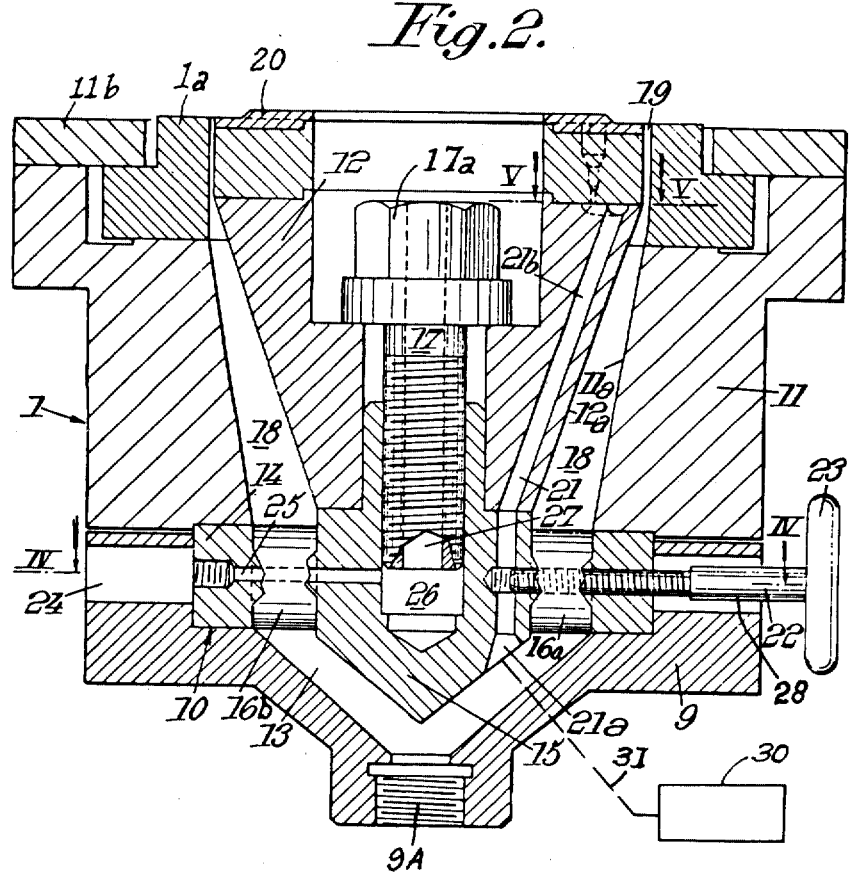
FIG. 2 is a vertical sectional view of the die head.
Figure 5:
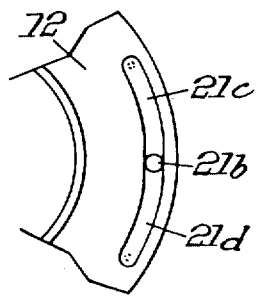
FIG. 5 is a fragmentary sectional view taken substantially along line V—V of FIG. 2.

FIG. 2 is a vertical section taken through the die head and shows the internal parts in greater detail. The die head 1 has a base 9 with an annular flange providing an internal recess or shoulder 10. Seated on the base is a jacket or housing 11. Within the housing is a central core 12. The extruder 6 of FIG. 1 delivers the heated plastic material into an inner space 13 within the base 9 through a plastic delivery line connected to the threaded entry 9a. The shoulder 10 envelops a crown or annular insert 14 which seats on the shoulder and has a central part 15 with a plurality of spokes 16 which connect the crown to the central portion 15. The outer jacket 11 of the die head is supported on the crown 14 and the base 9. The core 12 is attached to the central part 15 by a screw 17 which is hollowed to conduct the inflating air through the center of the head. An inner conical wall 11a of the housing 11 and an outer conical wall 12a of the core 12 form an annular tapered channel 18 which progressively tapers from the entry end immediately above the spokes 16 toward the discharge end, and which connects with the inner space 13. At the discharge end is provided an annular extrusion slot 19 between an outer annular die plate 1a and an inner annular die plate 20 concentric with respect to the outer die plate. The outer die plate 1a is fixed to the housing 11 by a ring 11b, whereas the inner die plate 20 is supported by core 12.

Figure 3:
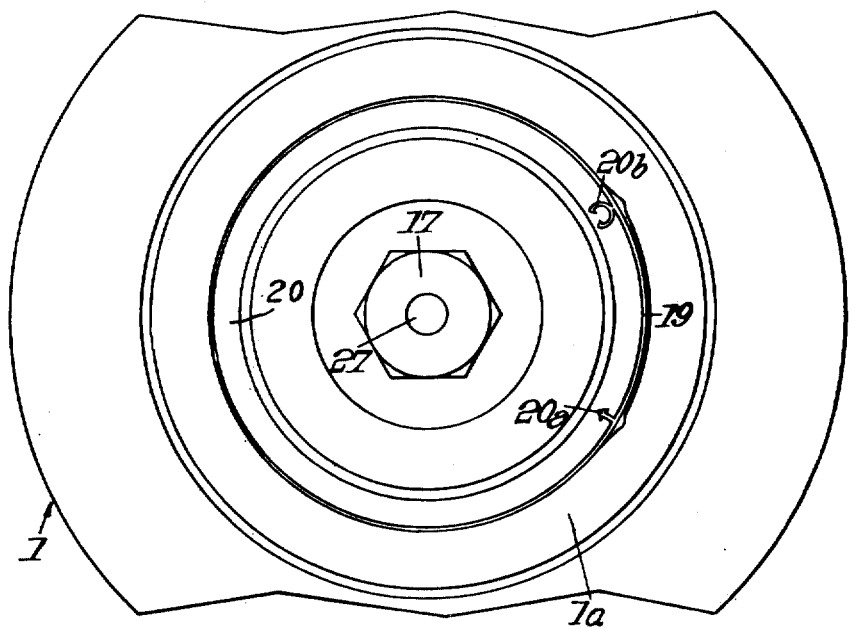
FIG. 3 shows a top plan view of the die plate.

As illustrated in FIG. 3, the inner die plate 20 is provided with shaped profile recesses 20a and 20b. These recesses communicate with the annular slot so that the profiles when extruded will be attached to the surface of the tubular film.

Figure 4:
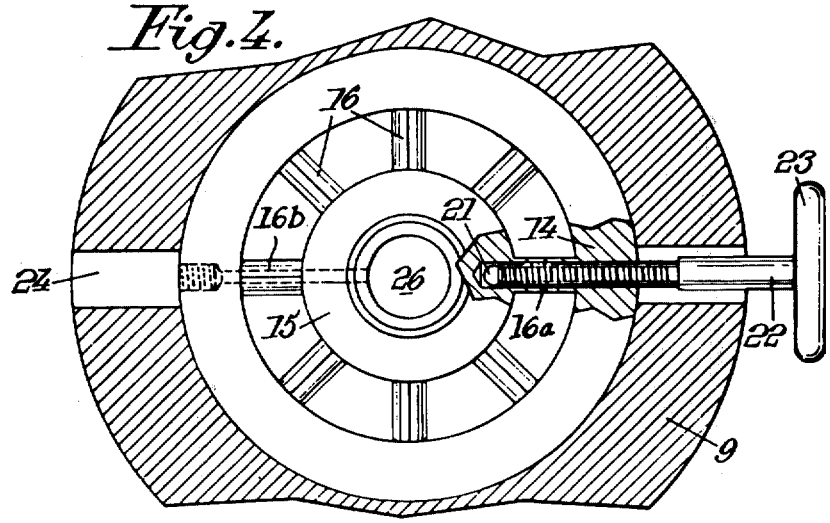
FIG. 4 is a sectional line taken substantially along line IV—IV of FIG. 2.

Plastic for the profiles is supplied through conduit 21, FIGS. 2 and 4, which is supplied by the main supply of plastic material delivered by the extruder 6 into the space 13 of the base 9. The lower part 21a of the conduit 21 is contained within the central portion 15 while the upper part 21b which is contained within the core 12, is divided at its end into branches 21c and 21d which individually feed the profile recesses 20b and 20a. It will, of course, be appreciated that separate conduits may be provided, one for each of the profile recesses.

The division of plastic material delivered by the extruder into the space 13 occurs at a substantial distance from the extrusion slot 19. The division occurs before the plastic passes around the spokes 16.

Profile plastic control means is provided in the form of a valve formed by the end of a screw 22 projecting through a passage 28 into the conduit 21. The screw 22 extends through one of the spokes 16a so that the valve control handle 23 is accessible from outside of the die head.

Bacause the plastic material which forms the profiles is drawn off at a location substantially upstream from or below the die opening, and away from the channel 18 where preformation of the wall of the tube takes place, the adjustment of the quantity of plastic material delivered into the conduit 21 has no bearing on the formation of the wall of the tube.

It will be understood that in some construcions, it may be desirable to provide a separate supply of plastic to the conduit 21 leading to the profile recesses. This will permit the delivery of a plastic having a different physical characteristic than the plastic for the tube. For example, an optimum plastic for the tube is one which will provide the characteristics necessary for a bag body which usually must have clarity and toughness plus being soft or resilient.

The profiles, however, function better if they are formed of a more rigid plastic which is not soft and resilient and this plastic does not need to have clarity, but does require a larger proportion of slip than the tube, without which the profiles cannot be interlocked. For the delivery of a separate plastic, a separate plastic source 30, FIG. 2, is provided connected by a conduit 31 to the conduit 21. With this connection none of the plastic from the chamber 13 flows into the passage 21.

The flow of plastic to the recesses may be controlled by rotating the valve stem 22 either if the plastic source for the profiles is from the main source, or supplied by the separate source 30. Also, if desired, the source 30 may be provided with a variable speed screw or other delivery means which can be controlled to regulate the flow rate of profile forming plastic.

Another variation which may be introduced when plastic from a separate source is delivered to the profile recesses, is that of using plastic at a lower temperature for the profiles. Since they have a greater thickness than the film, they will cool more slowly, and by beginning with a lower temperature an improved product results, as well as a higher production speed.

Another advantage of the provision of a separate supply of profile plastic is that higher delivery pressures can be employed to insure the complete and accurate formation of the profile shapes with a range of variation in the speed of delivery of the tube plastic.

The control of the profile flow rate to maintain uniform sized profiles regardless of the size of the tube also achieves the advantage of avoiding tubing wrinkles which have occurred in the tubing adjacent the juncture between the tubing and the profiles. The arrangement also permits additional speed extrusion since so often a compromise had to be reached with the extrusion speed altered to allow for proper profile formation. The arrangement also achieves a better shaped profile. It also permits a heavy base stem on the male profile, thereby preventing leaning of the profile during cooling which, of course, makes the rib and groove elements difficult to close.

In addition to changing the diameter of the tubing to change the bag size, different wall sizes can be made with the same size profile. This eliminates the necessity of having to change the die plate, nozzle and sizing ring and other parts of the die which was heretofore necessary.

As to the supply of air which circumferentially inflates or deflates the tubing, the conduit 4, FIG. 2, connects with an opening 24, FIG. 2, which connects to a passage 25 in another spoke 16b. The passage leads to a central tap hole 26 whih feeds up through the hollow passage 27, FIG. 3, in the center of the bolt 17. The passage 27 opens up through the top head of the bolt 17a to inflate the tubing.

In order to maintain a certain thickness of the wall tube, for different degrees of inflation or deflation, the extrusion speed must be adjusted by controlling the speed of rotation of the extruder 6, FIG. 1. The greater the inflation and the greater the diameter of the tube, the more the extrusion speed must be increased to provide sufficient material to maintain uniform wall thickness. Similarly, the greater the deflation, the smaller the diameter of the tube, and the less the extrusion speed required to provide sufficient material to maintain a uniform wall thickness. As the extrusion speed increases, the adjustment valve 22 is closed in proportion to the extrusion speed, so that the size of the profiles will not change. When the extrusion speed is reduced, the valve 22 is opened so that the size of the profiles remains constant. As will be noted for increased diameter and constant wall thickness, the extrusion rate must be increased while the rate of air supply is increased. To increase or decrease wall thickness, the extrusion rate is increased or decreased without changing the inflation or deflation rate. This, however, can only be done within certain die size limitations.

Thus, for changing the size of bags while maintaining the wall thickness constant, the extrusion rate and air inflation or deflation rate are changed interdependently, and the rate of delivery of profile plastic is independently altered so that the profile size will remain constant. Each of the flow control rates is interrelated, and a common control may be employed which automatically changes each of the factors automatically, rather than manually as indicated by the drawing. This may be accomplished by providing an electrical flow rate control for each of the variable plastic flows and for the air flow and controlling the flow rates as a function of an input such as setting the desired tube diameter.

As will also be observed, the rate of plastic flow for the profiles may be first adjusted to obtain optimum profile formation and then this rate retained constant with subsequent variation in tube plastic supply flow and variation in inflation and deflation of the air supply.

The described profile control mechanism covered only a die with one set of profiles, however, a die with two or more sets of profiles can, of course, be provided with control mechanisms for each as required.

I claim as my invention:

1. The method of making a continuous plastic tube with fastener profiles on the surface thereof for use in making reclosable bags comprising:
    extruding a heated thermoplastic material from a die through an annular die slot and thereby forming a tube and concurrently extruding plastic through shaped die profile openings aligned with said die slot and thereby forming mating complementary interlocking rib and groove fastener profiles on the tube surface,
    supplying tube plastic to the annular slot through a tube passage,
    supplying profile plastic to said fastener profile die openings through a profile passage,
    supplying gas into the tube emerging from the die slot to circumferentially control the size of the plastic tube,
    controllably varying the rate of plastic supply to the annular slot by increasing or decreasing the speed at which plastic material is forced through the tube passage to the slot to thereby vary the rate at which the tube is extruded,
    controllably varying the flow of the gas into the tube relative to the rate of plastic supply to control the increase in tube diameter and to obtain a tube of a predetermined wall thickness and tubing diameter,
    and controllably varying by adjustment the rate of plastic supply to said profile openings by restricting the flow of plastic supply through the profile passage so as to supply a tube with controlled variation in diameter and thickness with said profiles thereon of constant and optimum dimensions.

2. The method of making a continuous plastic tube with fastener profiles on the surface thereof for use in making reclosable bags in accordance with the method of claim 1 including supplying the plastic for the profiles from the same source as the plastic for the annular slot.

3. The method of making a continuous plastic tube with fastener profiles on the surface thereof for use in making reclosable bags in accordance with the steps of claim 1 and including supplying the plastic for said profile opening from a source different than the plastic for the annular die slot and with the profile plastic having different physical characteristics than the tube plastic.

4. The method of making a continuous plastic tube with fastener profiles on the surface thereof for use in making reclosable bags in accordance with the method of claim 1 wherein the rate of plastic supplied to said profile openings is varied to obtain optimum shape of interlocking profiles.

5. The method of making a continuous plastic tube with fastener profiles on the surface thereof for use in making reclosable bags in accordance with the method of claim 1 wherein the rate of plastic supplied to said profile openings is varied to obtain optimum size interlocking profiles relative to the gauge of film to which said profiles are attached.

6. The method of making a continuous plastic tube with fastener profiles on the surface thereof for use in making reclosable bags in accordance with the method of claim 1 wherein the rate of plastic supplied to said profile openings is varied to obtain optimum size interlocking profiles relative to the interlocking function of the profiles.

7. The method of making a continuous plastic tube with fastener profiles on the surface thereof for use in making reclosable bags in accordance with the method of claim 1 wherein the rate of plastic supplied to the annular slot is varied relative to the rate of plastic supplied to the profile openings to obtain optimum integral attachment between the profiles and tube.

8. The method of making a continuous plastic tube with fastener profiles on the surface thereof in accordance with the steps of claim 1 wherein the rates of plastic supply are relatively controlled for positioning the interlocking profiles axially parallel to the tube and in contact with the tube for the optimum duration of time during which the profiles are being formed and extruded.

9. The method of making a continuous plastic tube with fastener profiles on the surface thereof for use in making reclosable bags in accordance with the steps of claim 1 wherein the profile plastic is at a lower temperature than the tube plastic.

10. The method of making a continuous plastic tube with fastener profiles on the surface thereof for use in making reclosable bags in accordance with the method of claim 1 wherein sets of mating complementary interlocking rib and groove fastener profiles are formed on the tube surface.

11. The method of making a continuous plastic tube with fastener profiles on the surface thereof for use in making reclosable bags in accordance with the steps of claim 1:
    wherein the step of controllably varying the rate of plastic supply to the profile openings includes changing the amount of restriction in relation to the control of the rate of plastic supplied to the slot and in relation to the flow of gas into the tube to obtain a flow of plastic material so that profiles of said constant and optimum dimensions will result with controlled variation of the diameter and thickness of the tube.

12. The method of making a continuous plastic tube with small critically sized complementary interlocking fastener profiles thereon for use in making reclosable bags, comprising:

extruding a heated thermoplastic material from a die through an annular die slot and thereby forming a tube and concurrently extruding plastic through shaped small critically sized die profile openings and aligned with the slot and thereby forming mating complementary rib and groove fastener profiles on the tube surface;

supplying tube plastic to the annular slot;

supplying profile plastic to said fastener profile die openings;

supplying gas into the tube emerging from the die slot to circumferentially control the size of the plastic tube;

controllably varying by a first control means the rate of flow of plastic supply to the annular slot;

controllably varying by a second control means the rate of flow of profile forming plastic to the shaped profile openings until a small critically sized profile is extruded from said openings;

controllably varying by a third control means the flow of gas to control the diameter of the tube;

and changing said second control means as a function of the change of the first and third means so that as said first and third means are changed to obtain a tube of different dimensions the second means is changed to maintain the size of profile constant to said critical size.

13. The method of making a continuous plastic tube with fastener profiles on the surface thereof in accordance with the steps of claim 12;

including providing separate plastic supply sources for delivering plastic to the annular die slot and to the shaped die profile openings.

* * * * *